US005787439A

United States Patent [19]
Taysom

[11] Patent Number: 5,787,439
[45] Date of Patent: Jul. 28, 1998

[54] METHOD AND SYSTEM FOR MAINTAINING A PREFERRED SEQUENCE FOR ACCESSING A PLURALITY OF OBJECTS

[75] Inventor: Paul James Taysom, Provo, Utah

[73] Assignee: Novell, Inc., Provo, Utah

[21] Appl. No.: 766,746

[22] Filed: Dec. 13, 1996

[51] Int. Cl.[6] ...................................................... G06F 17/30
[52] U.S. Cl. ............................ 707/103; 707/8; 395/672; 395/673; 395/676
[58] Field of Search ......................... 707/8, 103; 395/672, 395/673, 676

[56] References Cited

U.S. PATENT DOCUMENTS

| | | | |
|---|---|---|---|
| 4,466,061 | 8/1984 | DeSantis et al. | 364/200 |
| 4,468,736 | 8/1984 | DaSantis et al. | 364/200 |
| 4,658,351 | 4/1987 | Teng | 364/200 |
| 4,791,554 | 12/1988 | Hirota et al. | 364/200 |
| 4,852,001 | 7/1989 | Tsushima et al. | 364/401 |
| 4,980,824 | 12/1990 | Tulpule et al. | 364/200 |
| 5,276,607 | 1/1994 | Harris et al. | 364/401 |
| 5,295,065 | 3/1994 | Chapman et al. | 364/401 |
| 5,325,525 | 6/1994 | Shan et al. | 395/650 |
| 5,375,239 | 12/1994 | Mortson | 395/700 |
| 5,513,357 | 3/1996 | Mortson | 395/700 |
| 5,604,908 | 2/1997 | Mortson | 395/705 |
| 5,712,996 | 1/1998 | Schepers | 395/392 |
| 6,638,359 | 6/1997 | Goti | 707/1 |

OTHER PUBLICATIONS

Lin et al, On Transformation of Logic Specifications into Procedural Programs, IEEE, pp. 274–281, Oct. 1989.
Shieh et al, Fine Grain Scheduler for Shared–Memory Multiprocessor Systems, IEEE, pp. 98–106, Mar. 1995.
Algorithms, Second Edition, Ch. 29, *Elementary Graph Algorithms*, pp. 415–435, Robert Sedgewick, 1988.
The Design and Analysis of Computer Algorithms, Ch. 5, *Algorithms on Graphs*, pp. 172–189, Aho et al., 1974.

*Primary Examiner*—Thomas G. Black
*Assistant Examiner*—Frantz Coby
*Attorney, Agent, or Firm*—Dinsmore & Shohl LLP

[57] ABSTRACT

A method and system for ensuring a preferred sequence for accessing a plurality of objects. The system includes a doubly linked list which contains a reference to each agent of a child object which is to be accessed before the object of the agent having the doubly linked list can be accessed. Each agent also includes a singly linked list which refers to each agent of a parent object. The singly linked list is used to clean up structures indicating dependencies after the dependencies no longer exist, and to inform a waiting agent that a child object has been accessed.

16 Claims, 4 Drawing Sheets

५,७८७,४३९

METHOD AND SYSTEM FOR MAINTAINING A PREFERRED SEQUENCE FOR ACCESSING A PLURALITY OF OBJECTS

TECHNICAL FIELD

The present invention relates generally to relationships between objects in a computer-implemented system, and more particularly to ensuring a preferred sequence for accessing a plurality of objects in the computer-implemented system.

BACKGROUND OF THE INVENTION

Certain relationships between entities can be described with respect to the ratio of one entity to another. For example, the ratio between a tree and its leaves is a one-to-many relationship. That is, each tree has many leaves, but each leaf is attached to only one tree. The ratio between a husband and wife is typically a one-to-one relationship: a husband has only one wife, and a wife has only one husband. The ratio between children and parents is frequently many-to-many: a parent can have more than one child, and a child can have more than one parent.

Such relationships are also common between computer-implemented entities. Each user can have a single password, and each password is associated with only one user, thus defining a one-to-one relationship between users and passwords. A file may have many data buffers, but each data buffer belongs to only one file, thus describing a one-to-many relationship between files and buffers. One-to-one and one-to-many relationships are relatively easy to maintain. A one-to-one relationship can be maintained simply be attaching to each entity a pointer to the other entity. One to many relationships are also relatively easy to maintain, and can be accomplished, for example, by creating a list for the file containing a reference to each buffer owned by the file, and maintaining in each buffer a pointer to the file. Thus, from the file each buffer can be accessed by traversing the list. From any particular buffer the file associated with the buffer can be accessed by traversing the pointer.

Many-to-many relationships can be more difficult to maintain. Computer-implemented file systems typically cache buffers of data in memory before writing the buffers to a persistent storage device, such as a disk drive. Such delayed writing can result in many-to-many dependencies between the data in various data buffers. For example, buffers A and B exist in memory and are associated with a database file. Buffers C and D also exist in memory and are associated with a log file which maintains a record of changes made to database records. Buffer A contains records P and Q of the database, which are modified. The changes to record P are logged in buffer C and the changes to record Q are logged in buffer D. Records S and T of the database are modified in buffer B. The changes to record S are logged in buffer C and the changes to record T are logged in buffer D. Because a database record cannot be written to persistent storage before the changes are logged to persistent storage, buffer A cannot be written until log buffers C and D are written, and buffer B cannot be written until log buffers C and D have been written. Imagine thousands of users making hundreds of changes each second, and it is easy to perceive the many dependencies which will be created.

Another aspect to these dependencies is that they can disappear after one of the buffers is accessed. For example, in the process of writing buffer A to disk, buffers C and D will be written to disk. Once this occurs, the dependency between buffer B and buffers C and D no longer exists. However, unless buffer B is aware of this action, it will still need to examine buffers C and D to determine if they must be written to disk before buffer B can be written to disk, unnecessarily increasing the processing time required to write buffer B to disk.

It is known to chain a simple linked list off of each buffer to identify buffers which are waiting on the buffer with the linked list. However, no efficient mechanism is provided to identify those buffers which a particular buffer is dependent on, nor for keeping track of changing dependencies. One way for ensuring that blocks of data are written in the proper sequence is by scanning all buffers which have been marked as modified to determine if a particular buffer must be written to persistent storage before another buffer can be written to persistent storage. While such a process may be acceptable for a relatively small number of buffers, in today's large computing environments, it is not uncommon to have to scan tens of thousands of modified buffers before any other buffer can be written to disk. This can lead to unacceptable delays in flushing a buffer to disk. The difficulty of keeping track of many-to-many relationships is so great that many systems are designed to avoid such relationships, and to only allow one-to-many relationships. One disadvantage of this is that such designs can result in additional processing.

As computer memory prices drop, memory caching of data buffers becomes more and more popular, increasing the importance of being able to efficiently maintain dependencies between objects. It is apparent that a method and system which can maintain such a preferred sequencing order between computer-implemented objects in an efficient manner would be highly desirable.

SUMMARY OF THE INVENTION

It is one object of this invention to provide a method and system for ensuring a preferred sequence for accessing a plurality of objects in a computer-implemented system.

It is another object of this invention to provide a method and system which efficiently maintains the dependencies between a plurality of objects such that all objects which must be accessed before a first object can be accessed can be quickly identified, and which efficiently notifies any other objects which had a dependency on an object which was accessed that the dependency no longer exists.

Additional objects, advantages and other novel features of the invention will be set forth in part in the description that follows and, in part, will become apparent to those skilled in the art upon examination of the invention. The objects and advantages of the invention may be realized and obtained by means of the instrumentalities and combinations particularly pointed out in the appended claims.

To achieve the foregoing and other objects in accordance with the purposes of the present invention as described above, a method and system for ensuring a preferred sequence for accessing a plurality of objects in a computer-implemented system is provided. Each object is associated with an agent. Each agent includes an access list reference and a signal list reference. The access list reference refers to agents associated with objects, if any, which are subordinate to the object associated with the agent having the access list reference. Such subordinate objects must be accessed before the object associated with the agent having the access list reference can be accessed. The signal list reference refers to a list of agents associated with objects, if any, to which the object associated with the agent having the signal list reference is subordinate, and which are to be notified after the object associated with the agent is accessed. Such a notification scheme allows the signaled agent to eliminate the dependency between its associated object and the previously subordinate object by removing the reference from its access reference list, expediting accessing of the object associated with the agent in the future.

Before accessing a particular object, it is first ensured that all objects subordinate to the object to be accessed are accessed. After the particular object is accessed, any agents waiting for the particular object to be accessed are signaled, and the dependency between the particular object and its parent objects can be eliminated.

According to one embodiment of this invention, a signal list reference of an agent points to a bond which is generated to identify each dependent relationship between two objects. Each bond includes a signal link used to link the bond into a list of bonds which are referred to by the signal list reference of the agent. The bond also includes a signal agent reference which refers to an agent of an object to which the agent having the signal list reference is subordinate. Thus an agent signal list reference points to a list of bonds, if any, maintained through the signal links of the bonds, which identify which objects are to be notified when the object of the agent having the signal list reference is accessed. Each bond also includes an access link used to create an access list of bonds which are referred to by the access list reference of an agent. The bond includes an access agent reference which refers to an agent of an object which is subordinate to the object of the agent having the access list reference. Thus, each access list reference points to a list of bonds, if any, which identify which objects are subordinate to and thus which must be accessed before the object of the agent having the access list reference can be accessed.

Before an object is accessed, it is determined whether the access list reference of the agent associated with the object is null, or empty. If so, then the object can be accessed immediately because the object is not dependent on another object first being accessed. If the access list reference is not empty, each subordinate agent referred to in the access list is notified that the object associated with that agent is to be accessed. An access, for example, can include a write operation on an object. As each subordinate agent is notified to write the object associated with the agent, each subordinate agent first determines whether its own access list reference has entries (not null), and thus must first be processed before the object associated with the respective agent can be written. If so, each subordinate agent signals its own subordinate agents maintained in its access list and indicates to each subordinate agent to write the object associated with the respective subordinate agent. This access list processing continues through subordinate agents until the signal reaches an agent with an empty, or null, access list. As each agent processes its own access list, a counter is maintained of the number of subordinate agents in its access list. After each subordinate agent successfully writes its associated object, the subordinate agent traverses its own signal list and signals any waiting agent(s) to which it is subordinate that the object was successfully written, and any signaled agent waiting on this particular agent decrements its counter. When the counter reaches zero, the agent can now safely write the object with which the agent is associated. If the write operation is successful, the agent then signals each agent in its signal list that the object has been written.

Thus, the method and system for ensuring a preferred sequence for accessing a plurality of objects according to this invention achieves a very efficient mechanism for maintaining the dependencies between objects. The invention eliminates the need to scan large numbers of buffers to discover such dependencies, and thus scales very well in a large system due to the links which efficiently establish the dependent relationships.

Still other objects of the present invention will become apparent to those skilled in this art from the following description, wherein there is shown and described a preferred embodiment of this invention, simply by way of illustration, of one of the best modes contemplated for carrying out the invention. As will be realized, the invention is capable of other different obvious aspects all without departing from the invention. Accordingly, the drawings and description will be regarded as illustrative in nature and not as restrictive.

BRIEF DESCRIPTION OF THE DRAWINGS

The accompanying drawings incorporated in and forming a part of this specification, illustrate several aspects of the present invention, and together with the description serve to explain the principles of the invention. In the drawings.

Reference will now be made in detail to the present preferred embodiments of the invention, an example of which is illustrated in the accompanying drawings, wherein like numerals indicate the same elements throughout the views.

DETAILED DESCRIPTION OF PREFERRED EMBODIMENTS

Figure 1:
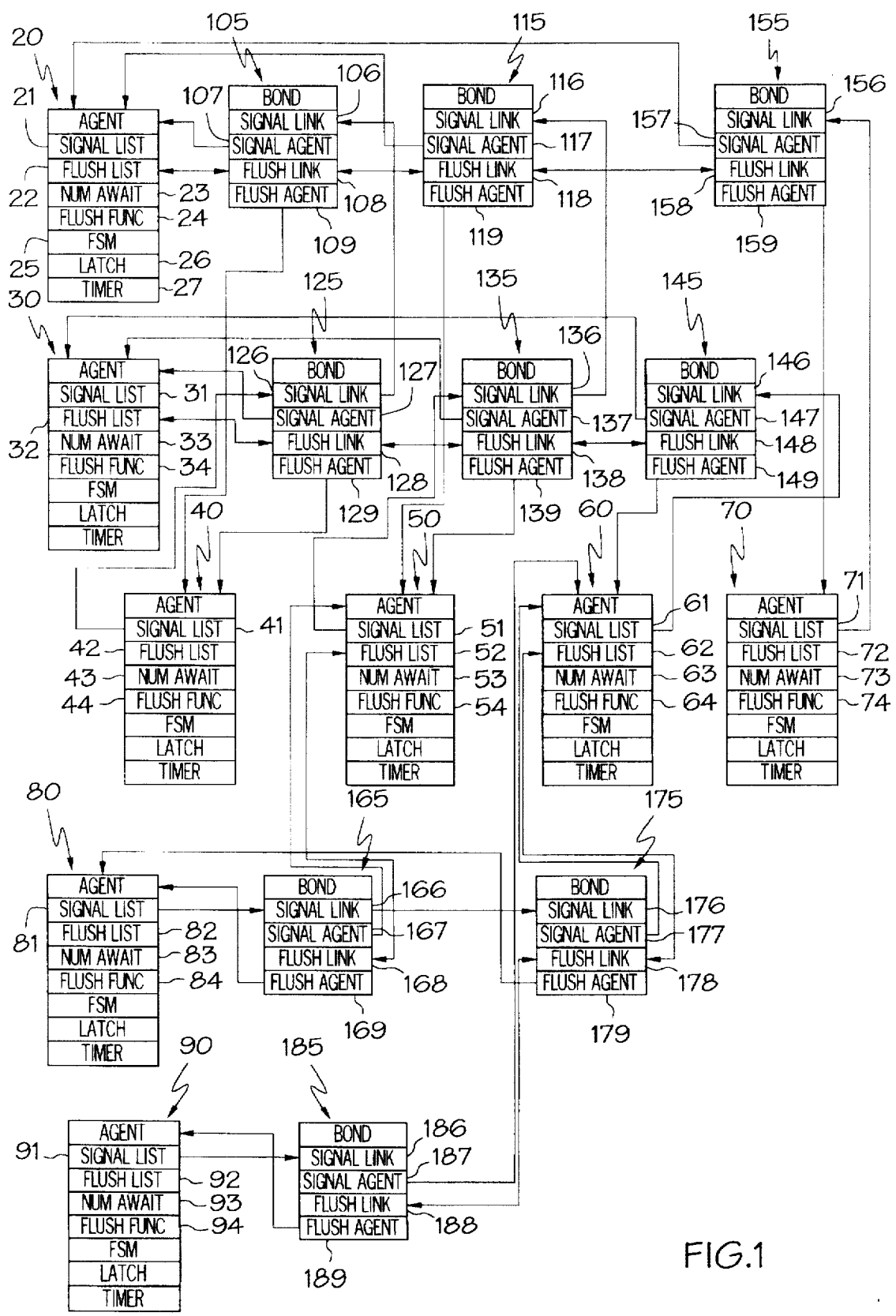
FIG. 1 is a block diagram illustrating the use of agents and bonds to maintain a preferred sequence for accessing a plurality of objects in a computer-implemented system, according to one embodiment of this invention.

Referring now to FIG. 1, the dependencies between a plurality of objects is represented and maintained by agents and bonds. An agent is associated with one particular object, such as a particular file, or buffer, or any other suitable object, and an object is associated with only one agent, and thus there is a one-to-one relationship between agents and objects. It is noted that it is the objects rather than the agents which have the dependencies of interest. However, because there is a one-to-one relationship between objects and agents, and to simplify the discussion regarding the use of agents and bonds, references may be made discussing the dependencies between agents, which should be understood to refer to the objects associated with the agents rather than the agents themselves. For example, with regard to FIG. 1, it is properly stated that the object associated with agent 20 has a parent relationship to the object associated with agent 40. For sake of simplicity, such a relationship will be referred to as agent 20 being a parent agent to agent 40. It will be understood that in fact it is the objects associated with the agents which have the relationship, rather than the agents.

The words parent and master are used synonymously throughout this specification to refer to an object which is dependent on another object. Thus, a parent object cannot be accessed until the object(s) to which it is a parent is accessed. Similarly, the words child and subordinate are used synonymously throughout the specification to refer to objects which have a parent object which cannot be accessed until the child object is accessed.

As described above, each object is associated with an agent. An agent can be both a parent agent and a child agent. Each respective agent has a signal list reference which directly or indirectly refers to a list of those agents to which the respective agent is a child agent. The phrase signal list is used to refer to the list referred to by an agent's signal list reference. An agent's signal list can be empty, which can be indicated by a null, or empty, signal list reference, which indicates that the agent has no parent agents, and thus is not subordinate to any other agent. Each agent also has an access list reference, which directly or indirectly refers to a list of those agents to which the respective agent is a parent agent, and which must be accessed prior to accessing the respective agent. The phrase access list is used to refer to the list As each child agent flushes its associated object, it signals any waiting parent agents in its signal list, and the numAwait filed will be decremented by one for any signaled agent which was awaiting a signal. The numAwait field of an agent will become zero once each child agent has flushed its associated object, indicating to the signaled agent that its dependencies have been eliminated, and that its object can now be flushed. Each agent can also contain a pointer to the function which will carry out the particular access of the object associated with the respective agent.

An agent can be a simple data structure or can be implemented as an object in an object oriented environment. The agent can contain the fields discussed herein, as well as other fields useful for the accessing process. According to one embodiment of this invention, the agent can have the following structure:

```
typedef struct Agent_s
{
    FsmLite_s          fsm;             /* FSM for accessing agent's object*/
    Latch_s            latch;           /* Latch to synchronize accessing    */
    OneShot_s          timer;           /* One shot timer to force accessing */
    STKtop_t           signalList;      /* List to signal afier I'm accessed */
    DQhead_t           accessList;      /* These must be accessed before agent can access */
    AgentSignalFunc_t  signal;          /* User defined signal function */
    LONG               numAwait;        /* Count of signals I'm still waiting for of
                                         * access functions previously called.
                                         * This makes processing the accessList
                                         * much simpler. */
    NINT               state;           /* State: (could be combined with numAwait)*/
}
``` referred to by an agent's access list reference. An agent's access list can be empty, which can be indicated by a null, or empty, access list reference, which indicates that the agent has no subordinate agents which must first be accessed before the respective agent can be accessed.

Figure 2:
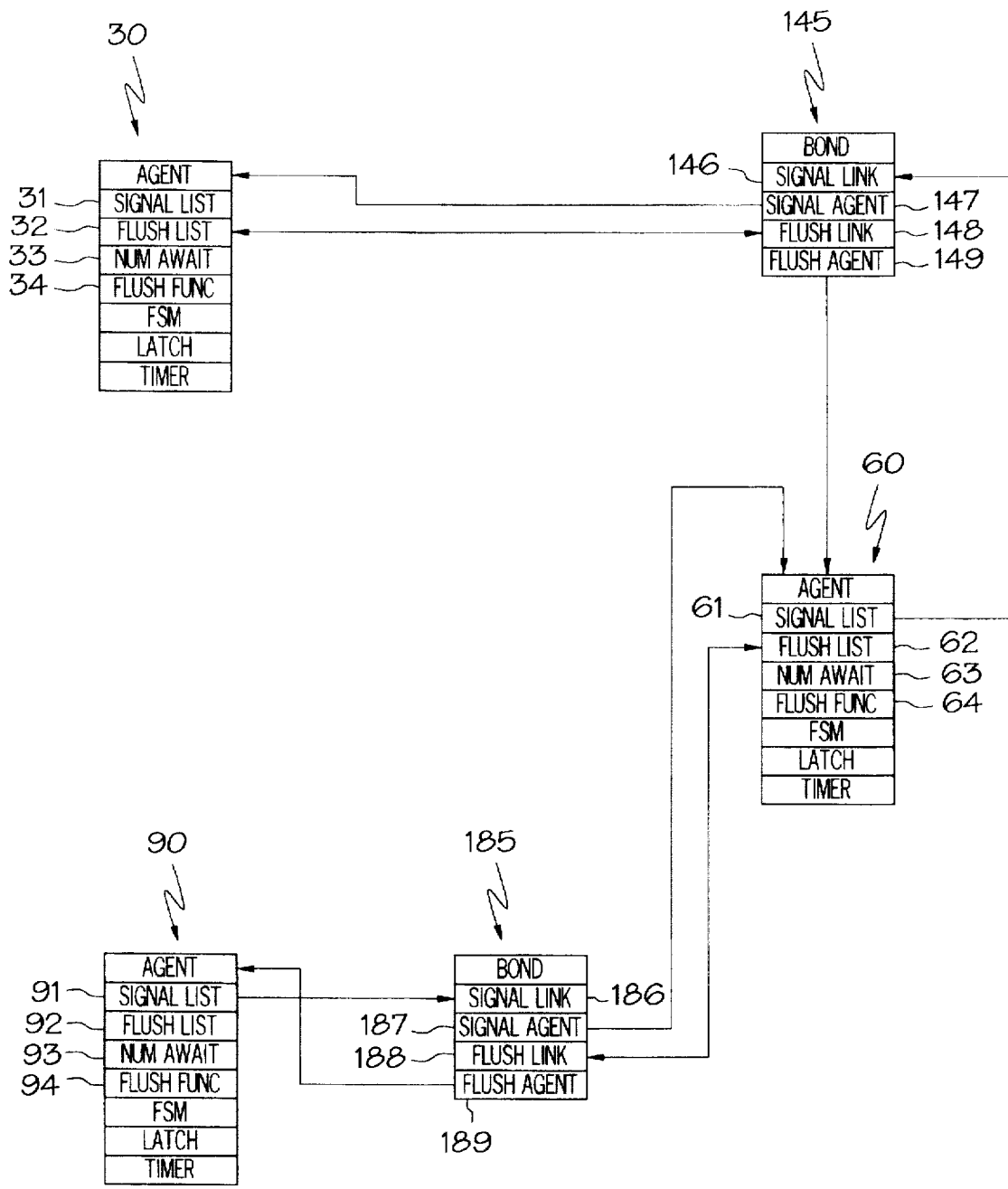
FIG. 2 is a block diagram illustrating remaining dependencies after certain dependencies in FIG. 1 have been eliminated.

As shown in FIGS. 1 and 2, the access list is referred to as a flush list, to represent that the invention will be described with respect to a write or flush access which results in the object associated with the agent being written to a persistent storage device, such as a disk drive. However, it should be apparent to those skilled in the art that the invention described herein has utility in other situations in which multiple objects can have dependencies, and is not limited solely to particular types of object access.

According to one embodiment of this invention, each agent also contains a counter, referred to in FIG. 1 as the numAwait field, which is used to maintain the count of the child agents in the flush list of the respective agent while the child agents are being flushed. This counter is incremented at the time the respective agent informs its child agents to flush the objects associated with the respective child agents.

The FSM field can be used to preserve state across a context switch. The latch field can comprise a simple reader/writer lock for synchronizing events associated with the object of the agent. The timer field can be used by the system to initiate the flushing sequence on the object associated with the agent within a predetermined amount of time.

Referring now to FIG. 1, flush list 22 of agent 20 points to bond 105. Bonds are created when a dependency arises between two objects. Each bond can be a member of a particular agent's signal list, which is maintained by the signal link field of the bond. Each bond can also be a member of a particular agent's flush list, which is maintained by the flush link field of the bond. The bond also contains a reference to a signal agent, which indicates which agent to signal when the signal list of which the bond is a member is processed. The bond likewise contains a reference to a flush agent, which indicates which agents are to be notified to flush their respective object when the flush list of which the bond is a member is processed. According to one embodiment of this invention, a bond can have the following structure:

```
typedef struct Bond_s
{
    STKlink_t    signalLink;   /* List of objects to be signaled       */
                               /* May be able to use a stack here      */
    Agent_s      *toSignal;    /* Object to signal after access is done */
    DQlink_t     accessLink;   /* Must wait until accessed             */
```

```
        Agent_s  *toAccess;  /* Object to access    */
}  Bond_s;
```

Each bond in a respective agent's flush list refers to a child agent to that respective agent. For example, flush list 22 of agent 20 includes bond 105, bond 115, and bond 155. As indicated by the double arrowheads extending from flush link to flush link, the flush list is a doubly linked list. Flush agent 109 of bond 105 refers to agent 40, indicating that agent 40 is a child agent to agent 20. (In other words, that the object associated with agent 20 is subordinate to the object associated with agent 40.) Similarly, flush agent 119 refers to agent 50 which indicates that agent 50 is also a child agent of agent 20. Flush agent 159 of bond 155 refers to agent 70, indicating that agent 70 is also a child agent of agent 20. Thus, before agent 20 can be flushed, agents 40, 50 and 70 must first be flushed. Signal list 21 of agent 20 is empty indicating that agent 20 is not a child agent to any other agent.

To flush agent 20, flush list 22 is first examined to determine if flush agent 20 is a parent agent to other agents. Since flush list 22 is not empty, child agents exist which must first be flushed before agent 20 can be flushed. Since the flush list of agent 20 comprises bonds 105, 115 and 155, agents 40, 50 and 70, each of which is referred to by flush agents 109, 119, and 159, respectively, are notified to flush their associated object. As each bond in flush list 22 is processed, agent 20 increments numAwait field 23 by 1, and delinks the respective bond from the flush list.

Immediately after agents 40, 50 and 70 have been told to flush their associated objects, and before any of their associated objects have been flushed, numAwait field 23 contains the value 3. Before agent 40 can flush its associated object, it must undergo the same determinations made with respect to agent 20. Thus, agent 40 determines if its flush list is empty. Since flush list 42 is empty, agent 40 has no child agents, and can invoke flush function 44 to flush its associated object. After the object has been flushed, agent 40 examines its signal list 41. Signal list 41 refers to bond 125 and via signal link 126 bond 105. It should be noted that the signal list, as indicated by the single arrowhead, is preferably a singly linked list. Signal agent 127 of bond 125 refers to agent 30. This is an indication that agent 30 is a parent agent of agent 40.

When a signal list is processed, the flush link of the bond being processed is examined. Since a bond is delinked from a flush list as the flush list of which the bond is a member is processed, a nonzero flush link encountered during signal list processing indicates that the bond is a member of a flush link which is not being processed. This is an indication not to signal the signal agent of the bond, since the signal agent is not currently in a flush process. Instead, the bond is delinked from the flush list of which it is a member because the dependency between the signal agent and the flush agent no longer exists. Thus, agent 30 is not signaled, and instead bond 125 is delinked from flush list 32 of agent 30 to eliminate the dependency between agent 30 and agent 40, since agent 40 has now flushed its object. After signal link 126 of bond 125 is referenced, bond 125 can be removed from memory. Signal agent 107 of bond 105 refers to agent 20, indicating that agent 20 is a parent agent to agent 40. Since flush link 108 is zero (it was delinked during the processing of flush list 22), agent 20, referred to by signal agent 107, is signaled that agent 40 has flushed itself, and agent 20 then decrements numAwait field 22 by 1. Bond 105 is now removed from memory.

During the processing of flush list 22, agent 50, which is a child agent of agent 20, was also notified to flush its associated object. Flush list 52 contains a reference to bond 165, indicating that agent 50 has a child agent. Flush agent 169 of bond 165 indicates that agent 80 is a child agent to agent 50. Agent 80 is requested by agent 50 to flush its associated object, and numAwait field 53 is incremented by one. Since flush link 168 does not point to another bond, agent 80 is the only child agent of agent 50. Agent 80 receives the request to flush its associated object and determines that flush list 82 is empty. Thus, flush function 84 can be invoked to flush the object associated with agent 80. After the object associated with agent 80 is flushed, signal list 81 of agent 80 is examined. Signal list 81 refers to bond 165. Signal agent 167 of bond 165 refers to agent 50. Since flush link 168 is null, agent 50 is notified that agent 80 has flushed itself. Agent 50 then decrements numAwait field 53 by 1. NumAwait field 53 now equals 0 and agent 50 can invoke flush function 54 to flush the object associated with agent 50. After the object associated with agent 50 is flushed signal list 51 of agent 50 is processed. Signal list 51 refers to bond 135, which contains signal agent 137. Since flush link field 138 is nonzero, agent 30 is not notified, and instead bond 135 is delinked from flush list 32. Signal list 51 also includes bond 115. Signal agent 117 of bond 115 refers to agent 20, which is then signaled that agent 50 has flushed itself. Upon receiving the signal, agent 20 decrements numAwait field 23 by 1. Bonds 135 and 115 are deleted from memory. Before a bond is removed from memory, any flush or signal list in which the bond is a member is fixed to point to the bonds remaining in the list.

Signal list 81 of agent 80 also includes bond 175. Signal agent 177 of bond 175 refers to agent 60 indicating that agent 80 is a child agent to agent 60. Since flush link field 178 is nonzero, agent 60 is not notified, and bond 175 is delinked from flush list 62 of agent 60, and is removed from memory.

Agent 70, upon receiving notification that it is to flush its associated object, determines that flush list 72 is empty and thus invokes flush function 74 to flush its associated object. After flush function 74 completes, agent 70 determines that bond 155 is a member of signal list 71. Signal agent 157 of bond 155 refers to agent 20, and since flush link field 158 is zero, agent 20 is signaled that agent 70 has flushed its associated object. Agent 20 decrements numAwait field 23. Now that agent 20 has been signaled by each of agents 40, 50 and 70, numAwait field 23 is 0. Agent 20 now can safely assume it has no more child agents, and thus can invoke flush function 24 to flush the object associated with agent 20 to disk.

FIG. 2 is a block diagram showing the dependencies between agents remaining after the object associated with agent 20 in FIG. 1 has been flushed. Because agents 40 and 50 were flushed during the process of flushing agent 20, agents 40 and 50 are no longer child agents of agent 30. If now it is determined that the object associated with agent 30 should be flushed to disk, flush list 32 of agent 30 is examined. Flush list 32 contains bond 145, and thus numAwait field 33 is incremented by 1. Agent 60 referred to by flush agent 149 of bond 145 is signaled to flush its associated object. Flush list 62 of agent 60 includes bond 185. Flush agent 189 of bond 185 refers to agent 90, which indicates that agent 90 is a child agent to agent 60. Agent 90 is requested to flush its associated object. Flush list 92 of agent 90 is empty, and thus agent 90 can invoke flush function 94 to flush the object associated with agent 90. After the object associated with agent 90 is flushed, signal list 91 is examined. Signal agent 187 refers to agent 60 and since flush link 188 is zero, agent 60 is notified that the object associated with agent 90 has been flushed. Upon receiving the signal, agent 60 decrements numAwait field 63 by 1. NumAwait field 63 will now equal 0, and agent 60 can invoke flush function 64 to flush the object associated with agent 60. After flush function 64 completes, signal list 61 is examined and it is determined that signal agent 147 of bond 145 refers to agent 30. Agent 30 is then signaled that agent 60 has flushed itself, and numAwait field 33 is decremented by 1. NumAwait field 33 now equals 0, and agent 30 can invoke flush function 34 to flush the object associated with agent 30.

The method and system according to this invention maintains a preferred sequence for accessing a plurality of objects in an efficient manner. A doubly linked list can be traversed to determine whether a particular object has child objects which must first be accessed before the particular object can be accessed, and a singly linked list is traversed to eliminate the dependencies from other objects. The resources used to maintain the dependencies can be removed from memory immediately upon serving their function.

Figure 3:
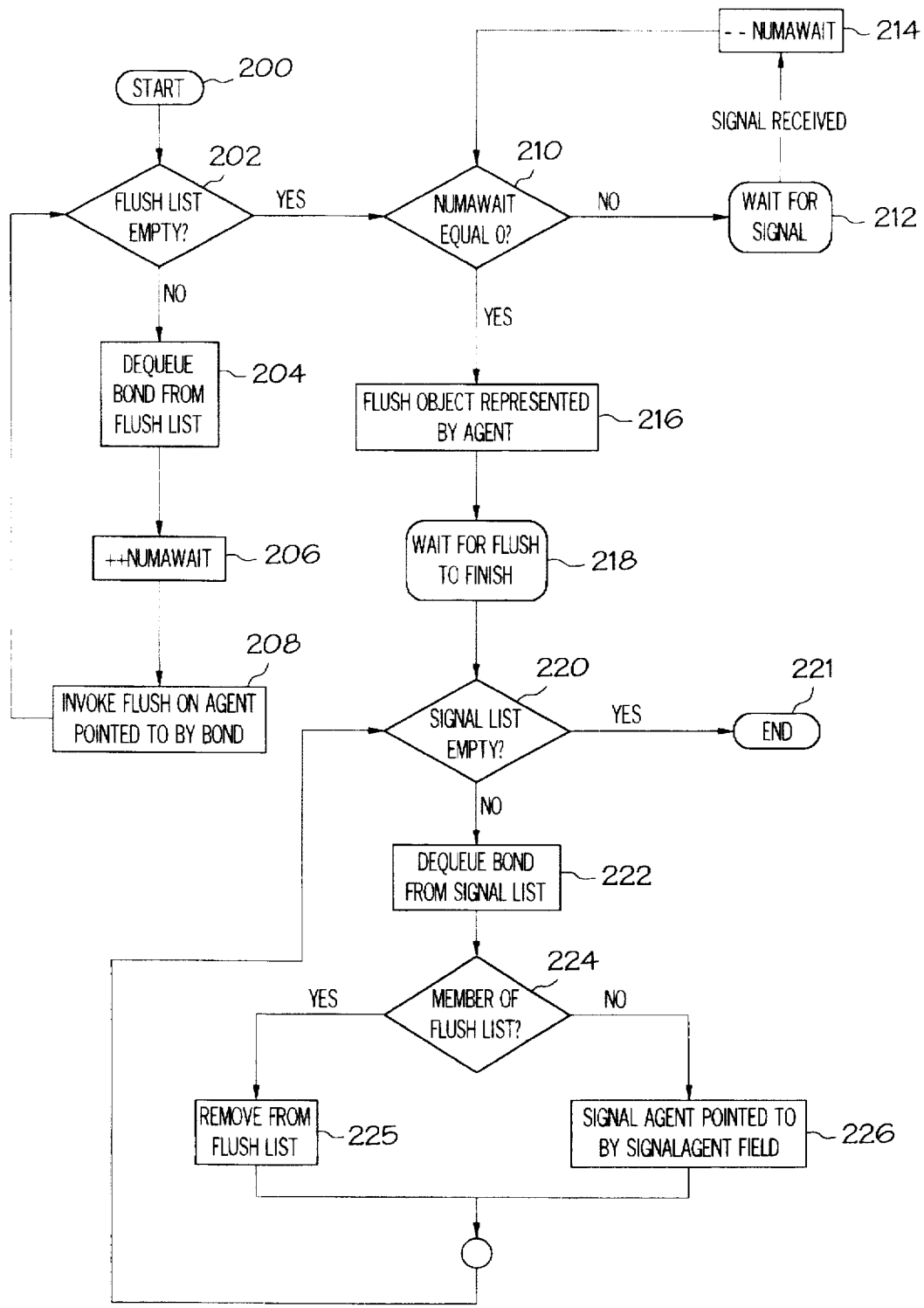
FIG. 3 is a flow diagram illustrating a method according to one embodiment of this invention for processing the agents and bonds shown in FIGS. 1 and 2.

FIG. 3 is a flow diagram illustrating a method for processing the agents and bonds shown in FIGS. 2 and 3, according to one embodiment of this invention. At block 200, it is determined that a particular object is to be flushed to disk. At block 202 the flush list of the agent associated with the object is examined. If the flush list is not empty, then at block 204, the first bond in the flush list is delinked from the flush list. As part of the delinking process, the flush list is maintained by fixing the links to the entries immediately before and immediately after that particular bond to point to each other. At block 206, the numAwait field of the agent is incremented by 1. At block 208, the flush process is initiated on the flush agent associated with the bond which was delinked from the flush list at block 204. At block 202, it is determined whether additional entries exist in the flush list. If additional entries exist, blocks 204, 206 and 208 are repeated for each bond in the flush list until the flush list is empty. After the flush list has been processed, it is determined at block 210 whether the numAwait field of the agent associated with the object to be flushed is equal to 0. If it is not, then at block 212, the agent associated with the object waits for signals from the child agents. For each signal received, at block 214, the numAwait field is decremented by 1, and at block 210, it is again determined whether the numAwait field equals 0. If the numAwait field does equal 0, then at block 216, the flush function in the agent is invoked to flush the object associated with the agent.

At block 218, the agent waits for the flush function to finish. After the flush function finishes, at block 220, it is determined whether the signal list of the agent associated with the object is empty. If the signal list is empty, that is an indication that the object has no parent agents, and the process ends at block 221. If the signal list is not empty, then at block 222, the first bond in the signal list is delinked from the signal list. At block 224, the bond's flush link is examined to determined whether the bond is a member of another agent's flush list. If the bond is not a member of a flush list, then the bond has been delinked from an agent awaiting a signal, and at block 226, the signal agent referred to in the bond is signaled that the object associated with the child agent has been flushed. If the bond is a member of a flush list, it is an indication that the particular flush list in which it is a member is not currently being processed, and the bond is delinked from that flush list at block 225. This process repeats itself until at block 220, the signal list is empty.

Figure 4:
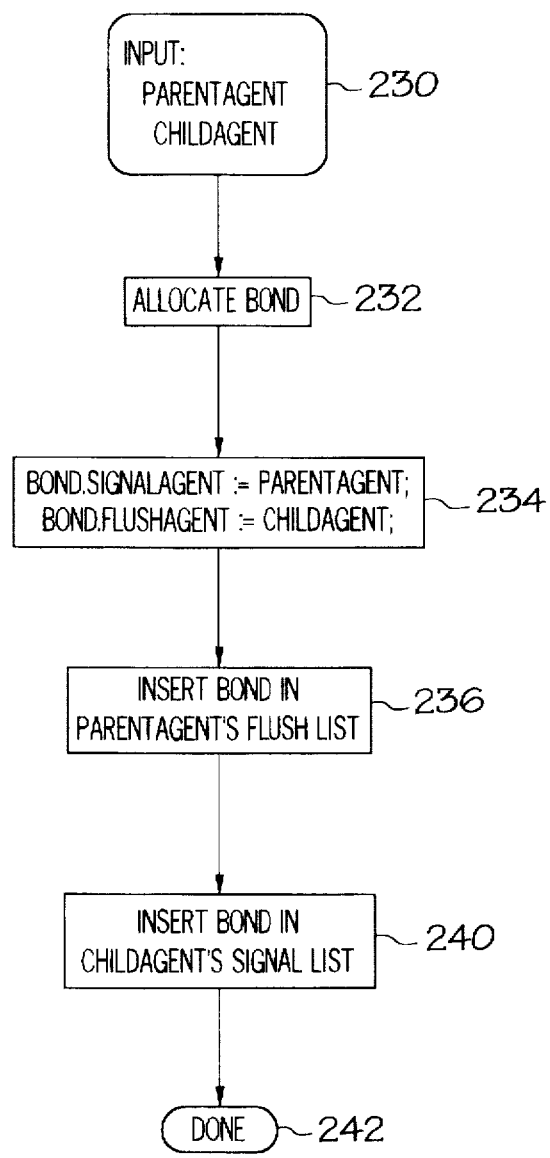
FIG. 4 is a flow diagram illustrating a method according to one embodiment of this invention for establishing the bonds shown in FIGS. 1 and 2.

FIG. 4 is a flow diagram of a method for creating bonds and establishing signal and access lists according to one embodiment of this invention. At block 230, the bond allocation function is invoked and is passed a parent agent and its child agent. At block 232 a bond is created. At block 234 the signal agent of the bond is set to refer to the parent agent and the flush agent is set to refer to the child agent. At block 236 the bond is inserted into the parent agent's access list, and at block 240 the bond is inserted into the child agent's signal list.

The processing of agents and bonds as described herein can be achieved by various mechanisms, including implementing agents and bonds as objects, and invoking appropriate methods of the respective object, or by asynchronous tasks, or threads, which process the agents and bonds as described herein.

It is apparent that the use of a bond is one way of maintaining the signal and flush lists described herein, but that other ways of maintaining such lists can be used. For example, rather than using a bond structure, a bit matrix, or a two-dimensional array of bits, could be used to track the dependencies. The matrix could include columns and rows of each object, each column representing a parent object and each row representing a child object. Child objects of a parent object can be indicated with a binary 1 in the row of the child object. When a parent object's access list is processed, the matrix is consulted to determine which objects are child objects to that parent. The state field in the agent of the parent object is set, and the flush process is initiated on each child object. After the child object is flushed, the matrix is examined to determine the parents of the child object. Each agent of a parent object whose state bit is set is notified that the child object is flushed, and the agent can decrement its numAwait count. If the state field of the agent of a parent object is zero, that agent was not being processed, and the bit in the matrix is set to 0, eliminating the dependency.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention and various embodiments and with various modifications as are suited to the particular use of the invention be defined by the claims appended hereto.

I claim:

1. A method for ensuring a preferred sequence for accessing a plurality of objects in a computer-implemented system, the steps comprising:

associating an agent with each of a plurality of objects, at least some of the objects having a preferential processing subordination with respect to other of the objects;

providing an access list reference and a signal list reference for each of the agents, the access list references of at least some of the agents containing a reference to one or more agents, each agent associated with a subordinate object, the signal list references of at least some of the agents containing a reference to one or more agents associated with objects to which the object of the respective agent is subordinate;

determining that a particular object is to be accessed;

ensuring that any object associated with an agent referenced in the access list reference of the agent associated with the particular object to be accessed is accessed prior to accessing the particular object; and signaling each waiting agent in the signal list reference of the agent associated with the particular object that the particular object has been accessed.

2. A method according to claim 1, wherein the ensuring step comprises repeatedly ensuring that the object associated with each subordinate agent in each access list reference of each subordinate agent which is requested to access the object associated with the respective subordinate agent is accessed before accessing the object associated with the agent having the access list reference.

3. A method according to claim 1, wherein the ensuring step further comprises receiving from each subordinate agent referenced in the access list reference of the agent associated with the particular object a notification that the subordinate agent has been accessed, and accessing the particular object after a same number of notifications as there are subordinate agents in the access list reference of the agent associated with the particular object have been received.

4. A method according to claim 1, wherein the type of access comprises a write request.

5. A computer-implemented system for ensuring a preferred sequence for accessing a plurality of objects, comprising:

a plurality of objects;

an agent associated with each of the plurality of objects, at least some of the objects having a preferential processing subordination with respect to other of the objects, each agent having an access list and a signal list;

the access list of a plurality of the agents containing a reference to one or more subordinate agents associated with subordinate objects, and the signal list of a plurality of the agents containing a reference to one or more agents associated with objects to which the object of the respective agent is subordinate.

6. A computer-implemented system according to claim 5, further comprising a manager for determining that a particular object is to be accessed.

7. A computer-implemented system according to claim 6, further comprising each respective agent being operative to indicate to each subordinate agent in the access list of the respective agent to access the object associated with the subordinate agent.

8. A computer-implemented system according to claim 6, further comprising each respective agent being operative to determine if an agent referred to in the signal list of the respective agent is awaiting a signal, and if it is to signal the agent.

9. A computer-implemented system according to claim 5, further comprising each respective agent being operative to ensure that each object associated with each agent in the access list of the respective agent has been accessed before accessing the object associated with the respective agent.

10. A computer-implemented system according to claim 5, further comprising a plurality of bonds, each bond representing a subordinate relationship between two objects, each bond having a signal link which comprises an entry in a respective signal list, a signal agent reference, an access link which comprises an entry in a respective access list, and a subordinate agent reference, the signal link comprising a reference to another bond in the respective signal list or a null entry indicating an end of the respective signal list, the access link comprising a reference to another bond in the respective access list or a null entry indicating an end of the respective access list, the subordinate agent reference referring to an agent of a subordinate object which is to be accessed before the object to which the subordinate object is subordinate is accessed, the signal agent reference referring to an agent of an object to which the object of the agent having the access list is subordinate.

11. A method for ensuring an order of access of a plurality of objects, the steps comprising:

a) associating an agent with each of a plurality of objects, each agent operative to be both a parent agent and a child agent, each agent having 1) an access list reference operative to point to an access list, each entry in the access list comprising a child agent reference to a child agent of the agent having the access list, the object of each child agent to be accessed before the object of the parent agent can be accessed, and 2) a signal list reference operative to point to a signal list, each entry in the signal list comprising a parent agent reference to a parent agent of the agent having the signal list, the object of each parent agent to be notified upon access of the object associated with the agent having the signal list;

b) determining that a particular object must be accessed;

c) indicating to each child agent in the access list of the agent associated with the particular object to access the object associated with the child agent;

d) determining that the object associated with each child agent in the access list of the agent associated with the particular object has been accessed and then accessing the particular object; and e) signaling each waiting parent agent in the signal list of the agent associated with the particular object that the particular object has been accessed.

12. A method according to claim 11, wherein the indicating step further comprises repeating an indication to each child agent in each access list of each child agent which is requested to access the object associated with the respective child agent.

13. A method according to claim 11, wherein each agent has a child agent counter, and the determining step comprises modifying the child agent counter as a function of the number of child agents in the access list of the agent associated with the particular object, modifying the counter when each child agent in the access list of the agent associated with the particular object is accessed, and accessing the particular object when the counter indicates that each child agent in the access list has been accessed.

14. A method according to claim 11, wherein the type of access comprises flushing the object to a persistent storage apparatus.

15. A method according to claim 11, further comprising generating a bond for each child-parent relationship of the plurality of agents, the bond having a signal link for maintaining a respective signal list, a parent agent reference, an access link for maintaining a respective access list, and a child agent reference, the signal link comprising a reference to another bond in the respective signal list or a null entry indicating an end of the respective signal list, the access link comprising a reference to another bond in the respective access list or a null entry indicating an end of the respective access list, the child agent reference referring to a child agent of an object which is to be accessed before an object of a parent agent associated with the bond is to be accessed, the parent agent reference referring to an object of a parent agent which cannot be accessed until the object associated with the agent having the signal list is accessed.

16. A method according to claim 15, further comprising deleting the bond when signaling the child agent referred to by the child agent reference in the respective bond.

* * * * *